United States Patent [19]

Voges

[11] 4,452,586
[45] Jun. 5, 1984

[54] METHOD OF BLAST HEATING

[75] Inventor: Bernd Voges, Essen, Fed. Rep. of Germany

[73] Assignee: Krupp-Koppers GmbH, Essen, Fed. Rep. of Germany

[21] Appl. No.: 393,363

[22] Filed: Jun. 29, 1982

[30] Foreign Application Priority Data

Jul. 4, 1981 [DE] Fed. Rep. of Germany ....... 3126494

[51] Int. Cl.³ .......................... F24H 7/00; F28D 17/00
[52] U.S. Cl. ......................................... 432/30; 432/40; 165/DIG. 12
[58] Field of Search ................... 432/29, 30, 40, 216, 432/217; 165/DIG. 12, 104.28

[56] References Cited

U.S. PATENT DOCUMENTS

| | | | |
|---|---|---|---|
| 1,316,086 | 9/1919 | Dovel | 432/30 |
| 3,108,790 | 10/1963 | Agarwal | 432/40 |
| 3,150,865 | 9/1964 | Goeke | 432/30 |
| 3,623,549 | 11/1971 | Smith, Jr. | 165/DIG. 12 |
| 3,631,920 | 1/1972 | Nishikawa et al. | 432/40 |
| 3,897,202 | 7/1975 | Ackermann et al. | 432/29 |
| 4,061,186 | 12/1977 | Ljung | 165/DIG. 12 |
| 4,119,142 | 10/1978 | Margen | 165/DIG. 12 |
| 4,149,453 | 4/1979 | Reed | 98/46 |
| 4,200,147 | 4/1980 | Hedbom | 165/DIG. 12 |
| 4,257,579 | 3/1981 | Bruhn et al. | 165/DIG. 12 |

Primary Examiner—Henry C. Yuen
Attorney, Agent, or Firm—Michael J. Striker

[57] ABSTRACT

A method of and a device for blast heating is described, employing separate indirect heat exchangers for combustion air and fuel gas fed to a regenerator and flue gases discharged from the regenerator. The indirect heat exchangers share heat-transfer liquid recirculating in a circuit in which an auxiliary heat exchanger is connected. In the latter exchanger, the temperature of transfer liquid is increased by combustion of partial streams of combustion air and fuel gas branched off downstream of the indirect heat exchangers. The temperature is increased to such a value which preheats the fuel gas to a temperature at which a substitution of fuel gas of a low calorific value, such as waste gas from a blast furnace, for fuel gas of high calorific value, is made possible.

1 Claim, 1 Drawing Figure

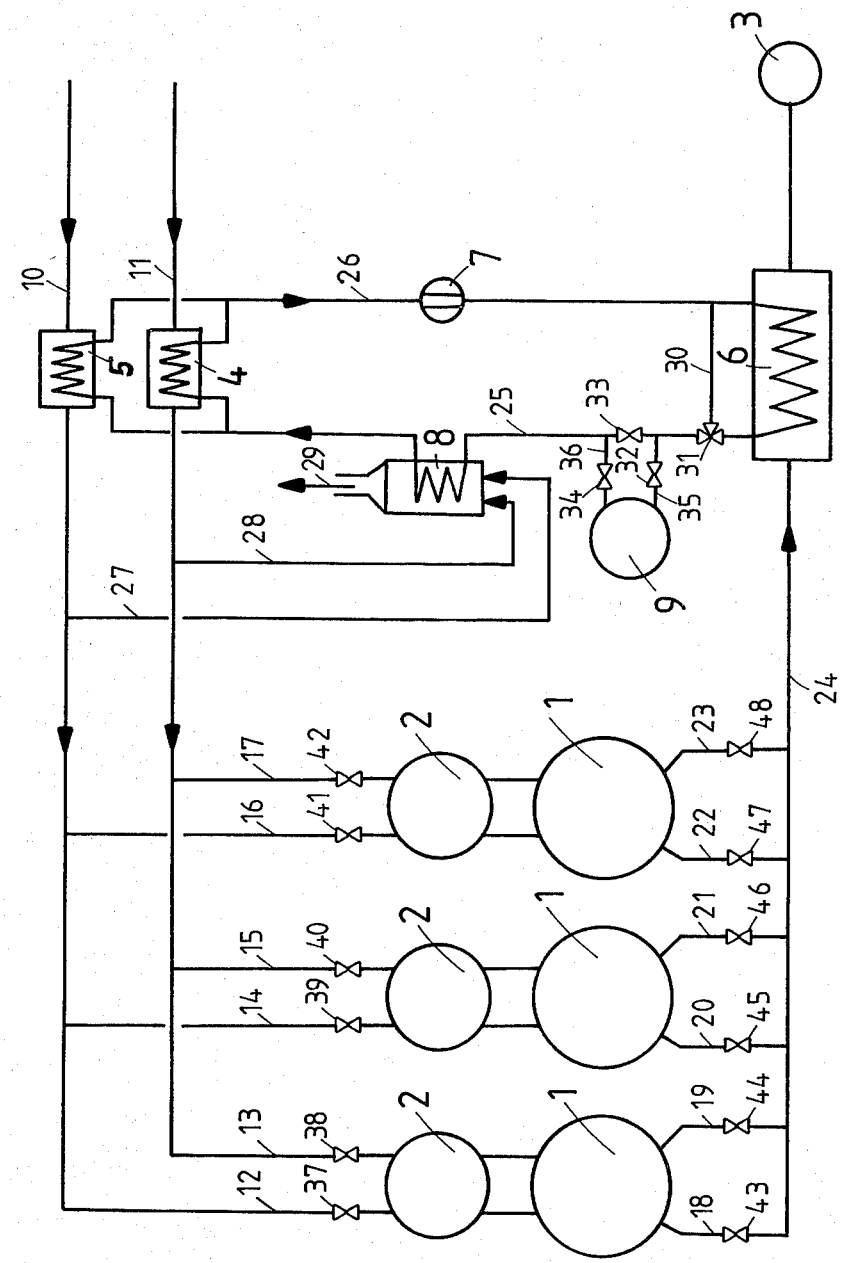

METHOD OF BLAST HEATING

BACKGROUND OF THE INVENTION

The present invention relates in general to blast heating, and in particular to a method of operating a blast heating device or regenerator in which heat contained in flue gas after the discharge of the latter from the regenerator is transferred to combustion air and fuel dust by means of an indirect heat exchanger operating with a liquid heat-transfer medium, so that the combustion air and fuel dust be preheated by the flue gas.

In a blast heater or regenerator pertaining to a high furnace, the furnace blast to be heated and flue gases of higher temperature generated in the combustion spaces of the regenerator are alternately flown through the latter. The flue gases result during the combustion of gaseous and/or liquid fuels. For economical operation of a blast furnace a blast temperature of about 1250° C. is normally required. As a consequence, the temperature of flue gas employed for heating the regenerator must have a correspondingly higher value, and at the inlet in the regenerator amounts to about 1450° C. Such high flue gas temperature can be achieved for example by combusting a mixture of waste gas from a blast furnace with waste coke oven gas or natural gas, but also by combusting preheated waste gas from the blast furnace together with preheated combustion air. Alternatively, it is also possible to use a combination of the two aforementioned methods, namely a small preheating of the combustion media and simultaneously admixing coke oven waste gas or natural gas.

Since furnace blasts fed in the regenerator alternately with the flue gas are, from operational and technological reasons, compressed to pressures of about 4 to 5 bar, it has at the entry into the regenerator already a relatively high temperature, for example of 150° C. This temperature of course conditions the final temperature of the flue gas at its discharge from the regenerator, to be also relatively high. For example, the final temperature of the flue gas at its exit from the regenerator amounts to about 200° C. at the beginning of the heating phase and about 300° C. at the end of this phase. In periods of low cost of energy, the flue gas having this temperature is normally discharged through a chimney, inasmuch as the costs of investment for the energy recovery would be higher than the value of the saved energy.

In periods when the cost of energy substantially increases, this economic consideration is completely changed, and both new power plants and existing, old plants are being equipped with heat-regenerating devices.

In the case of new power plants this problem is normally solved in such a manner that flue gases exhausted from the regenerator are immediately guided through a heat exchanger with the combustion air and fuel gas, in which tangible heat is indirectly transferred to the combustion gas and to the fuel gas fed into combustion spaces of the regenerator. It is also known how to bring flue gases before entry in the aforementioned heat exchanger to a higher temperature by means of a series-connected combustion chamber in which gases having low calorific value are burned, so that the preheating temperatures of the combustion air and fuel gas are further increased. This known system, however, has the disadvantage that both the combustion air and fuel gas, as well as flue gas, must be fed through the same heat exchanger. Consequently, gas conduits must in this case be designed with a large diameter, and the heat exchanger must be located in close proximity to the regenerator, and all remaining conduits must be accurately adjusted to this system. For this reason, this prior-art system is suitable primarily for installation in newly built power plants only. If this system is applied to extant old plants, it is necessary to make extensive and costly reconstructions in the type of conduits, and in addition local space conditions frequently make the reconstruction impossible.

A heat-exchanging system has been developed especially for use in reconstruction of existing, old power plants. In such this system, the heat exchanger for the flue gas and the heat exchangers for the combustion air, as well as for the fuel gas, are separated from each other and coupled together by a suitable liquid heat-transferring medium which is recirculated. In such known system, heat of flue gas upon its discharge from the regenerator is first transferred to the liquid heat-transferring medium, such as for example alkyldiphenyl, which in turn transfers its heat energy to the combustion air and to the fuel gas in the aforementioned separate heat exchangers. The system of this kind is suitable particularly for the additional installation into an extant power plant, because the individual heat exchangers can be connected separately to the existing pipe conduits or, alternatively, can bypass the latter. In this manner, expensive redesign and changes in the pipe conduits are generally avoided.

Flue gas exhausted from the regenerator at a certain temperature from the regenerator can naturally preheat the combustion media to this temperature, for example to 150° C. If, however, it is desired to use waste gas from a blast oven as the fuel gas, then these preheating temperatures no longer suffice for bringing the combustion spaces in the regenerator to the desired high combustion temperature of about 1450° C., for example. In using the above-described separate heat-exchanging system, it is therefore necessary to admit to the waste gas from the blast furnace a calorically rich fuel such as for example waste coke oven gas, or natural gas, or fuel oil, to obtain the high combustion temperature. However, this measure is disadvantageous, inasmuch as waste gas from blast furnaces is the byproduct of the production of pig iron and is abundantly available at low costs, whereas fuel of high calorific value, to be admixed, must be bought at high price or withdrawn from another application in the range or outside the complex of metallurgical plants.

SUMMARY OF THE INVENTION

It is therefore a general object of the present invention to overcome the aforementioned disadvantages.

More particularly, it is an object of the invention to provide an improved method of operating a regenerator or a blast heating device which permits a full substitution of high calorific values for the low calorific gas, such as waste gas from a blast furnace.

An additional object of the invention is to provide such an improved method which makes it possible to obtain a uniform preheating temperature of the fuel gas and/or combustion air, in spite of large temperature differences at the beginning and at the end of the heating phase.

A further object of the invention is to provide such an improved method which enables the achievement of the aforementioned objectives without the necessity of expensive reconstructions and interruptions in operation of existing regenerators or blast heating devices.

In keeping with these objects, and others which will become apparent hereafter, the method of this invention resides in the steps of transferring heat contained in flue gas after its discharge from a regenerator, to combustion air and fuel gas in indirect heat exchangers employing a liquid heat-transfer medium, then additionally heating the liquid heat-transfer medium in another heat exchanger which transfers heat to the medium from gases having low calorific value, such as waste gas from a blast furnace, to a temperature at which the combustion air and fuel gas is preheated to a temperature permitting full substitution of fuel gas components of a low calorific value for fuel gas components of high calorific value.

In other words, the method of this invention makes it possible that the regenerator is heated exclusively with a gas of low calorific value. For this purpose, there is suitable, as mentioned before, particularly waste gas from a blast furnace. It is of course possible to employ another kind of low caloric gas, as long as its calorific value is not below about 2500 kJ/Nm$^3$.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates schematically the circuit diagram of a regenerating system according to this invention.

DESCRIPTION OF THE PREFERRED EMBODIMENT

The illustrated regenerative or blast-heating system shows schematically those parts which are necessary for the claimed method, whereas the blast furnace complex of a metallurgical plant is omitted for the sake of clarity. The blast-heating arrangement in this example includes three blast heaters or regenerators 1 with associated combustion spaces 2. The construction of the regenerators 1 is conventional, generally known in the art. Feed conduit 10 supplies to the regenerators about 67,000 Nm$^3$/h of combustion air and feed conduit 11 supplies 10,000 Nm$^3$/h of waste gas from a blast furnace, to serve as fuel gas. Indirect heat exchangers 4 and 5 are arranged in respective feed conduits 11 and 10 to preheat the combustion air and the fuel gas to a temperature of about 250° C. At this temperature, the combustion media are fed via branch conduits 12 and 13 into combustion spaces 2 of respective regenerators 1, where the combustion takes place. Fuel gases discharged from regenerators 1 at a temperature between 200° and 300° C. are conducted through conduits 18–23 and a common collecting conduit 24 into chimney 3. In series with the collecting conduit 24 an indirect heat exchanger 6 is arranged in which the collected stream of flue gas, totalling about 160,000 Nm$^3$/h, is cooled down to a temperature of about 150° C. The indirect heat exchangers 4–6 are so-called tube heat exchangers, each having a pipe system through which a liquid heat-transfer medium, such as for example alkyl diphenyl flows.

Heat recovered in the heat exchanger 6 for flue gases is transferred by means of the liquid medium through conduit 25 to the pipe system of the heat exchangers 4 and 5 for the combustion air and fuel gas, respectively. In the latter two heat exchangers, the liquid heat-transfer medium is cooled down proportionally to the preheating of the combustion media. Through conduit 26 the cooled-down heat-transfer medium is withdrawn and, by a circulating pump 7, is returned into the pipe system of the heat exchanger 6 for the flue gases, in which it is again reheated, and thus the circulation of the liquid medium is completed.

According to the method of this invention, the heating of the liquid heat-transfer medium and thus the preheating of the combustion media is not made uncontrolled, and to a temperature only which is possible by the heat content and temperature of flue gases in the heat exchanger 6. The method of this invention, in contrast, provides for additional heating of the liquid heat-transfer medium in the conduit 25 by means of an interconnected additional heat exchanger, in this case in the form of a tube heater 8 which increases the temperature of the liquid medium to about 300° C. The pipe system in the tube furnace 8, through which the liquid heat-transfer medium flows, is heated by combustion of partial streams of combustion air and fuel gas branched off from the conduits 10 and 11 downstream of heat exchangers 5 and 4. For this purpose, there are provided branch conduits 27 and 28 through which the preheated combustion air and preheated fuel gas is fed into the tube furnace 8. Of course, it is also possible to heat tube furnace 8 by means of partial streams of both combustion media tapped from conduits 10 and 11 upstream of the heat exchangers 4 and 5. Flue gases generated during the combustion in tube furnace 8 are discharged through conduit 29 into chimney 3, or discharged through a separate chimney into the atmosphere.

In order to prevent falling below the point of condensation, with resulting corrosion in the heat exchanger 6 for flue gases, there is provided a bypass conduit 30 between conduits 26 and 25 so that the liquid heat-transfer medium might circulate in the heat exchanger 6. When the heat-transfer medium has reached a temperature of at least 100° C., it is first directed through conduit 25 and the corresponding adjustment of the circulation is effected by a three-way valve 31.

In addition, a storage tank 9 can be connected in series with conduits 25 so that at a corresponding adjustment of valves 32–34 the liquid medium is charged through conduit 35 into the tank and discharged therefrom through conduit 36. The tank 9 makes it possible to store heat energy of the contained liquid heat-transfer medium. In this manner, when the amount of available heat in the flue gases is high, as is the case at the end of the heating phase of the regenerators, the liquid medium is stored in the tank and reintroduced into circulation at the beginning of the heat phase, when the available heat in the flue gases is particularly low. This equalization of the heat transfer brings about not only a corresponding equalization of the preheating of the combustion media, but also affects favorably the operation of the pipe furnace 8. In the latter case, the heat-transfer medium is introduced into the pipe furnace 8 at a comparatively constant temperature, and consequently oversized furnaces 8 under these circumstances are no longer necessary. Tank 9 is of course provided on its outer side with a heat insulation. Valves 37–48 serve for switching over the regenerators from the heating phase to the preheating phase, and vice versa.

In summary, in employing the method of this invention the temperature of the liquid heat-transfer medium, and thus the preheating temperature of the combustion media, can be raised to such an extent that the application of fuel gases having high content of components of high calorific value or of fuel oil for heating the regenerators 1, can be dispensed with. The method of this invention furthermore simplifies the installation of separate heat exchangers 4–6, inasmuch as the extant conduits for fuel gas, combustion air and flue gases do not require any notable changes or modifications. The additional pipe furnace 8 can be installed without reconstructing the existing conduit system and without interrupting the operation of the plant. The tube furnace 8 if necessary can be located also outside the regenerative system proper.

It will be understood that each of the elements described above, or two or more together, may also find a useful application in other types of constructions differing from the types described above.

While the invention has been illustrated and described in connection with a specific example of a blast-heating device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A blast-heating device having at least one regenerator provided with combustion spaces and with conduits for discharging flue gas, a combustion air supply conduit and a fuel gas supply conduit connected respectively to said combustion spaces, indirect heat exchangers connected respectively in said conduits for combustion air, fuel gas ana flue gas, a recirculation conduit connected to said indirect heat exchangers for circulating a shared heat-transfer liquid, an auxiliary heat exchanger in the form of tube heater connected in series with the circulation line for said heat-transfer liquid, branch conduits connected to said combustion air line and fuel gas line downstream of the corresponding indirect heat exchangers to feed partial streams of the combustion air and of the fuel gas to said auxiliary heat exchanger, comprising a heat-storing tank for the heat-transfer liquid connectable in series with the circulation line of the liquid between said indirect heat exchangers.

* * * * *